No. 613,305. Patented Nov. 1, 1898.
J. PORTEOUS.
ORCHARD PLOW.
(Application filed Mar. 21, 1898.)
(No Model.) 2 Sheets—Sheet 1.

Witnesses.
J. E. Monteverde.
Walter F. Vand.

Inventor.
James Porteous,
by Wm. F. Booth,
his atty.

THE NORRIS PETERS CO., PHOTO-LITHO., WASHINGTON, D. C.

No. 613,305. Patented Nov. 1, 1898.
J. PORTEOUS.
ORCHARD PLOW.
(Application filed Mar. 21, 1898.)
(No Model.) 2 Sheets—Sheet 2.
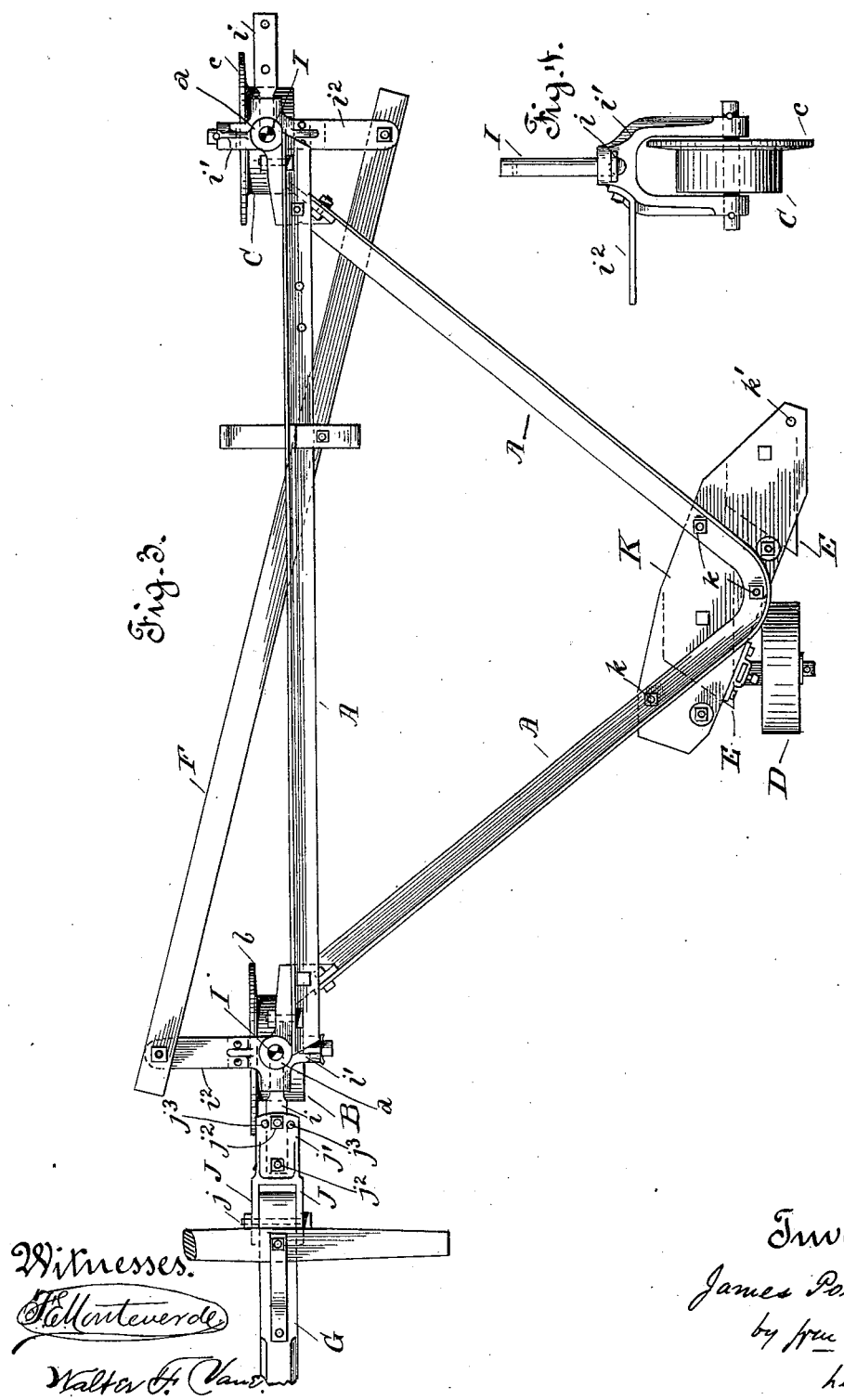
Witnesses.
Inventor.
James Porteous,
by Wm. F. Booth,
his Atty.

UNITED STATES PATENT OFFICE.

JAMES PORTEOUS, OF FRESNO, CALIFORNIA.

ORCHARD-PLOW.

SPECIFICATION forming part of Letters Patent No. 613,305, dated November 1, 1898.

Application filed March 21, 1898. Serial No. 674,575. (No model.)

*To all whom it may concern:*

Be it known that I, JAMES PORTEOUS, a citizen of the United States, residing at Fresno, in the county of Fresno and State of California, have invented certain new and useful Improvements in Orchard-Plows; and I do hereby declare the following to be a full, clear, and exact description of the same.

My invention relates to that class of plows and cultivators which by reason of the plows or teeth being located to one side of the line of draft are intended for use in orchards, vineyards, &c., so that the horses may walk in the clear space between rows, while the ground may be worked close up to the trees, vines, &c.

My invention consists in a triangular frame supported upon wheels located one at or near each angle or corner, those at the extremities of the base being swiveled and adapted to be operated in unison, either independently or automatically, to counteract the strain of the plows or teeth, and thereby hold the frame straight in the line of draft, a tongue or pole connected with one of the swivel-wheels and adapted to turn it, and a plow-bottom or other cultivator located at the apex of the frame.

It also consists in a wheeled frame having similar ends, a plow-bottom or other cultivator carried by the frame and adapted to be reversed, and a tongue or pole adapted to be changed from one end to the other of the frame, together with details by which said reversal and change are effected.

It also consists in the novel construction, arrangement, and combinations of parts, which, together with the objects of my invention, I shall hereinafter fully describe.

Figure 1:
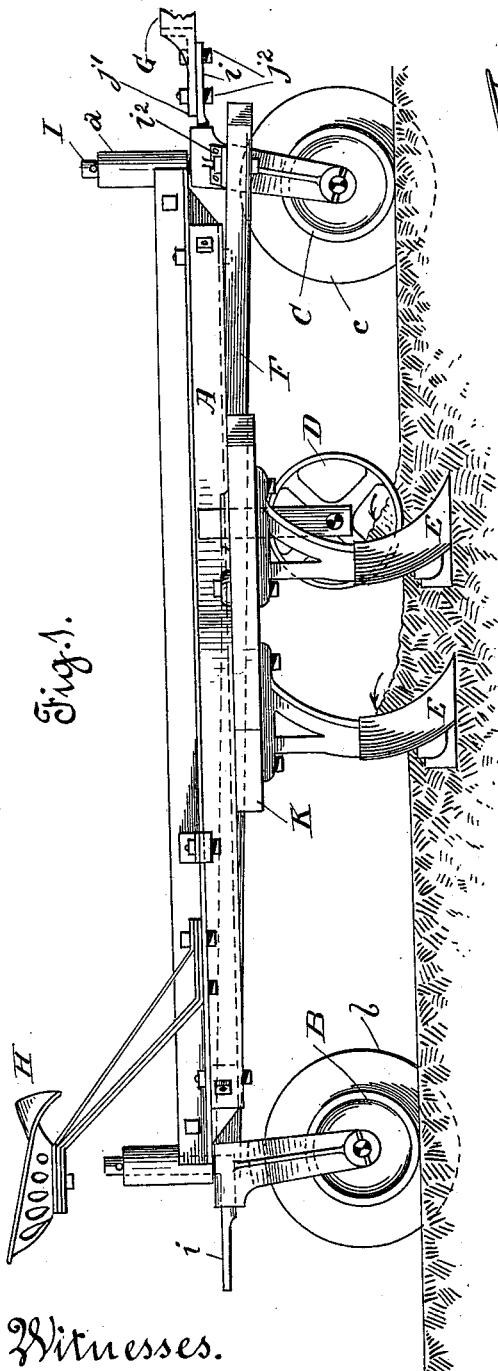
Figure 2:
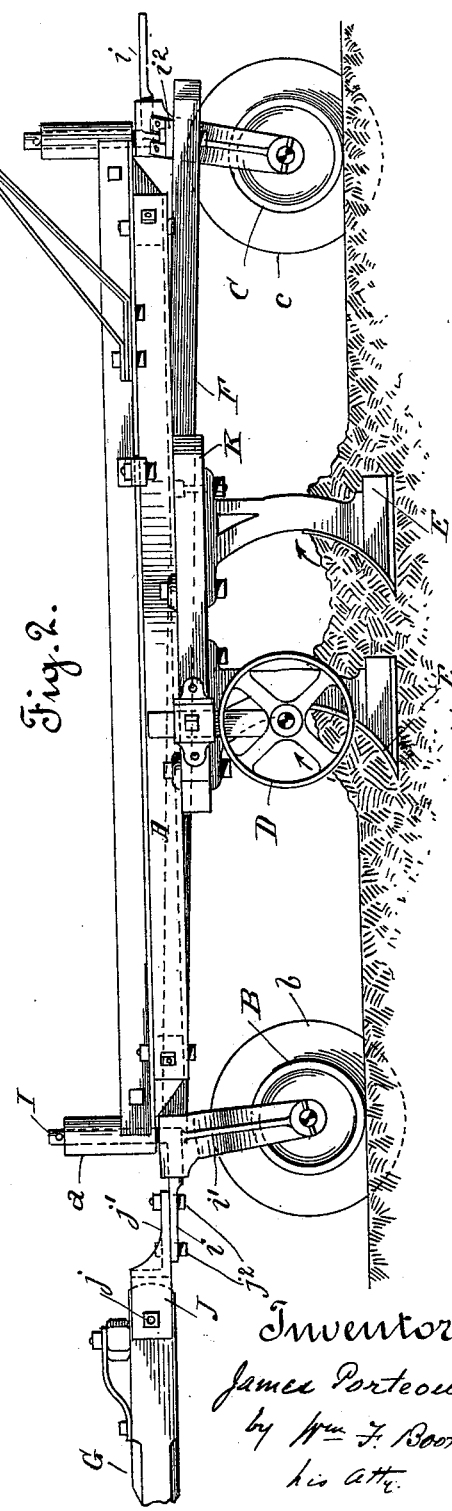

Referring to the accompanying drawings, Figure 1 is a side elevation of my orchard-plow, showing it adapted to throw the earth to the trees. Fig. 2 is a side elevation of same, showing its plow-bottoms, draft-pole, and seat reversed, adapting the implement to throw the earth from the trees. Fig. 3 is a plan of the plow. Fig. 4 is a front view of the swivel-wheel.

The frame A of the plow is an isosceles triangle and may be made of any suitable material, preferably angle-bars. This frame is supported at or near its corners or angles by the wheels B, C, and D, of which B and C are at the extremities of the base of the frame and are the guide-wheels, and D is at the apex and is the gage-wheel. At the apex of the frame are the plow-bottoms E, the depth of penetration of which into the ground is determined by the gage-wheel.

The two guide-wheels B and C, in addition to occupying relatively similar positions at what may be termed the "front" and "rear" ends of the implement, are similar in themselves, are similarly mounted, and each is adapted to swivel. They are, moreover, connected by the link-bar F, Fig. 3, in such manner that when one is turned to one angle the other is turned to a correspondingly opposite angle. The result of this is the keeping of the frame approximately straight in the line of draft, for when by reason of the plow resistance the frame is pulled into an angle with the pole the front wheel, being connected with said pole and still remaining in line with it, is necessarily turned to an outward angle with the frame, thereby resisting the strain of the plow-bottoms to pull its end in. At the same time the rear wheel, being connected with the front one, turns to an inward angle, and thereby resists the tendency to force its end out, and the result is the keeping of the frame in the line of draft. From this it is evident that the connection between the two wheels, whereby they operate in unison, while being the best construction for the reason that it renders the operation automatic and therefore certain, yet such connection is not absolutely essential in all cases, because the two wheels may be independent, though capable by separate and independent adjustment of attaining the desired end—as, for example, the front wheel may be controlled by the horses and the rear wheel by the operator through a suitable lever. I deem, however, the automatic feature the more practical.

The pole G is adapted to be connected with and to turn either guide-wheel, and the line of draft is in the line of the base of the triangle. The seat H is located at one end of the frame in such position as to carry the weight of the operator approximately over that guide-wheel at the end opposite to that at which the pole is attached.

The foregoing is descriptive only of the general relative arrangement of the main parts of the implement, and from this arrangement follows the operation of the plow, which may be thus stated: The line of draft being to one side of the plow-bottoms enables the horses to walk in the clear space between the rows, while the plow-bottoms themselves extend over and work close up to the trees, getting under the low-lying branches without injury. This general result, while it is the same as that attained by this class of implements, is yet reached in my invention by the use of a triangular frame mounted and carried wholly upon its own three wheels, located at or near its angles. My machine, being mounted as described, is necessarily subjected to the strain of the resistance which the plow-bottoms meet in the ground, said strain tending to throw or work it around out of the proper line of travel. This tendency is efficiently resisted and is fully counteracted by the guide-wheels directed by the tongue or pole, for it is evident that the frame cannot use either guide-wheel for a pivotal center about which, under the strain of the plow-bottom resistance, either end can be thrown. This strain is therefore met by the whole length of the base of the frame, and the pole is left comparatively free to serve its function of guiding, thereby throwing little, if any, neck strain on the horses.

In order to make the resistance of the guide-wheels effective, I make them comparatively heavy and form them with deep flanges $b$ and $c$, which sink into and take hold of the ground, the rear one under the weight of the rider and the front one under the direct strain of the draft.

The novel details with respect to the mounting of the guide-wheels, their connection, and the connection of the pole are these: Both ends being alike, a description of one will suffice for the other. Secured to the frame is a vertical socket $a$. In this is fitted and adapted to turn a spindle I, which has extending at right angles horizontally a bar $i$. To the base of this combined spindle and bar is secured, as by casting, the wheel-fork $i'$, in the extremities of which the wheel is mounted. To this same general casting is rigidly secured or formed a projecting arm $i^2$, and between the front and rear arms $i^2$ extends the link-bar F, connecting the two wheels, as heretofore described.

J are the side plates of the pole-coupling bracket. Between these the pole is secured by a bolt $j$. From these plates extends rearwardly a plate $j'$, forming part of the pole-coupling bracket, and said plate lies upon and is secured by the bolts $j^2$ to the horizontal bar $i$ of the swivel connection. Thus the pole turns the swivel-wheel. Side holes $j^3$ in plate $j'$ enable the pole to be connected with the swivel connection at different lateral angles by simply using either of them for the rear one of the two bolts $j^2$.

One of the chief features of my plow is its adaptability to be changed from one capable of throwing the earth to the trees to one fitted to throw it from the trees. After the plow has been used for the former purpose it is necessary to accomplish the latter result, and instead of having two separate and oppositely-arranged implements a single one, such as mine, can be converted into one for either purpose. The changes necessary are these: The pole must be transferred to the other end of the implement. Thus in Fig. 1 it will be seen that the pole is at the end where the wheel B is located. To change it, the bolts $j^2$ are removed, and the pole, with its coupling-bracket, is taken around without moving the plow-frame at all and is coupled onto the other end, as is shown in Fig. 2. It is for this purpose that both ends are alike. Next the seat H is unbolted from the frame and bolted to the opposite end, as seen in Fig. 2. Now the plow-bottoms must be turned around. To permit of this, these plow-bottoms are secured to a head-plate K, of any suitable material, which plate is secured by bolts, such as $k$, to the apex of frame A. This plate is provided with suitable holes, such as $k'$, which will permit it to be bolted through the same holes in the frame in either position. When this plate is reversed—that is, turned end for end—the plow-bottoms, which in Fig. 1 will throw the earth to the trees, will in Fig. 2 throw it from the trees. The gage-wheel D is also secured to this head-plate, so that whereas in Fig. 1 it is on the inside of the adjacent plow-bottom in Fig. 2 it is on the outside. This completes the change, and the same implement is thus rendered capable of plowing to or from the trees. It will be seen that an important factor in this adaptability to be reversed lies in the symmetry of the frame and the corresponding relative positions of the parts in either arrangement.

Although I have herein shown plow-bottoms only, it is obvious that other forms of cultivators, disks, and teeth may be used. I may also state that although I have herein described the wheels B and C as flanged wheels it is obvious that plain disks or flanges may be used, which, entering the ground, would serve both as supporting-wheels and as means for holding to the ground.

Having thus described my invention, what I claim as new, and desire to secure by Letters Patent, is—

1. An orchard-plow, comprising a frame having the shape of an isosceles triangle, a supporting swivel-wheel at each extremity of the base of said frame, a connection between the two whereby they operate in unison to guide the frame, a tongue or pole connected with and adapted to turn one of said swivel-wheels, a plow-bottom or cultivator at the apex of said frame, and a gage-wheel supporting said frame at its apex.

2. An orchard-plow, comprising a triangular frame, a supporting swivel-wheel at each extremity of the base of said frame, said wheels having flanges adapted to cut into the ground, a connection between said wheels, whereby they operate in unison to guide the frame, a tongue or pole connected with or adapted to turn one of said swivel-wheels, a plow-bottom or cultivator at the apex of said frame, and a gage-wheel supporting said frame at its apex.

3. An orchard-plow, comprising a frame having the shape of an isosceles triangle, a supporting-wheel at each extremity of the base of said frame, said wheels having flanges adapted to cut into the ground, a connection between said wheels, whereby they operate in unison, to guide the frame, a tongue or pole connected with and adapted to turn one of said swivel-wheels, a plow-bottom or cultivator at the apex of said frame, and a gage-wheel supporting said frame at its apex.

4. An orchard-plow, comprising a triangular frame, a supporting swivel-wheel at each extremity of the base of said frame, said wheels having flanges adapted to cut into the ground, a connection between said wheels whereby they operate in unison, to guide the frame, a seat for the driver, supported by the frame approximately over one of said wheels, a tongue or pole connected with and adapted to turn the other of said wheels, a plow-bottom or cultivator at the apex of said frame, and a gage-wheel supporting said frame at its apex.

5. An orchard-plow, comprising a frame having the shape of an isosceles triangle, a supporting swivel-wheel at each extremity of the base of said frame, said wheels having flanges adapted to cut into the ground, a connection between said wheels whereby they operate in unison to guide the frame, a seat for the driver, supported by the frame approximately over one of said wheels, a tongue or pole connected with and adapted to turn the other of said wheels, a plow-bottom or other cultivator at the apex of said frame, and a gage-wheel supporting said frame at its apex.

6. An orchard-plow, comprising a wheeled triangular frame, having similar base extremities, a draft device, similar connections at the base extremities of said frame, adapting the draft device to be connected to either extremity, and a reversible plow-bottom or cultivator carried by the apex of said frame.

7. An orchard-plow, comprising a triangular frame having similar base extremities, a supporting swivel-wheel at each base extremity, means for operating said wheels to guide the frame in the line of draft, a tongue or pole at one extremity of the frame-base, a reversible plow-bottom or cultivator carried at the apex of said frame, and a gage-wheel supporting said frame at its apex.

8. An orchard-plow, comprising a triangular frame having similar base extremities, a supporting swivel-wheel at each base extremity, a connection adapting said wheels to operate in unison to guide the frame, a tongue or pole and connections adapting it to be connected with either swivel-wheel to guide it, a reversible plow-bottom or cultivator carried by the apex of said frame, and a gage-wheel supporting said frame at its apex.

9. An orchard-plow, comprising a triangular frame having similar base extremities, a supporting swivel-wheel at each base extremity, a connection adapting said wheels to operate in unison to guide the frame, a tongue or pole and connections adapting it to be connected with either swivel-wheel to guide it, a reversible plow-bottom or cultivator carried by the apex of said frame, a gage-wheel supporting said frame at its apex, and a seat for the driver, having connections adapting it to be transferred to that end of the frame-base, opposite to the end to which the tongue or pole is connected.

10. In an orchard-plow, the combination of a frame having a vertical socket at its end, the combined spindle, bar and wheel-fork forming the swivel connection for the wheel, the tongue or pole, and the coupling-bracket consisting of the side plates fitted to the pole and the horizontal plate secured to the bar of the swivel connection, said plate having the series of holes adapting the tongue or pole to be connected at various angles.

11. An orchard-plow, comprising a triangular frame having similar base extremities, with vertical sockets, a supporting-wheel at each base extremity connected to work in unison, the similar swivel connections for each wheel, consisting of the combined spindle, bar and wheel-fork, the tongue or pole with its coupling-bracket adapted to be joined to the bar of either swivel-wheel connection, the reversible head-plate, removably secured to the apex of the frame, and a plow-bottom or cultivator and a gage-wheel carried by said reversible head-plate.

12. An orchard-plow, comprising a triangular frame having similar base extremities, with vertical sockets, a supporting-wheel at each base extremity connected to work in unison, the similar swivel connections for each wheel, consisting of the combined spindle, bar and wheel-fork, the tongue or pole with its coupling-bracket adapted to be joined to the bar of either swivel-wheel connection, the reversible head-plate removably secured to the apex of the frame, a plow-bottom or cultivator and a gage-wheel carried by said reversible wheel-plate, and a changeable seat for the driver.

In witness whereof I have hereunto set my hand.

JAMES PORTEOUS.

Witnesses:
D. B. RICHARDS,
WALTER F. VANE.